(12) United States Patent
Han et al.

(10) Patent No.: US 10,868,584 B2
(45) Date of Patent: Dec. 15, 2020

(54) ANTENNA DEVICE AND ELECTRONIC DEVICE INCLUDING SAME

(71) Applicant: Samsung Electronics Co., Ltd., Suwon-si (KR)

(72) Inventors: Seungku Han, Suwon-si (KR); Byungchul Kim, Yongin-si (KR); Seungtae Ko, Suwon-si (KR); Youngju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/485,009

(22) PCT Filed: Feb. 20, 2018

(86) PCT No.: PCT/KR2018/002055
§ 371 (c)(1),
(2) Date: Aug. 9, 2019

(87) PCT Pub. No.: WO2018/155876
PCT Pub. Date: Aug. 30, 2018

(65) Prior Publication Data
US 2020/0007193 A1 Jan. 2, 2020

(30) Foreign Application Priority Data
Feb. 21, 2017 (KR) .................. 10-2017-0022795

(51) Int. Cl.
*H01Q 1/12* (2006.01)
*H04B 5/00* (2006.01)
(Continued)

(52) U.S. Cl.
CPC .......... *H04B 5/0037* (2013.01); *H01F 27/36* (2013.01); *H01F 38/14* (2013.01); *H02J 7/025* (2013.01);
(Continued)

(58) Field of Classification Search
CPC ............ H01Q 1/12; H01Q 1/125; H01Q 1/18; H01Q 1/38
See application file for complete search history.

(56) References Cited

U.S. PATENT DOCUMENTS 3,696,436 A 10/1972 Yokoi et al.
5,801,660 A * 9/1998 Ohtsuka ............... H01Q 9/0414
343/700 MS
(Continued)

FOREIGN PATENT DOCUMENTS

CN 102570013 A 7/2012
CN 102683772 A 9/2012
(Continued)

OTHER PUBLICATIONS

Partial Supplementary European Search Report dated Nov. 8, 2019, issued in a counterpart European application No. 18757095.7-1205 / 3570368.
(Continued)

*Primary Examiner* — Thuy Vinh Tran
(74) *Attorney, Agent, or Firm* — Jefferson IP Law, LLP (57) ABSTRACT

Various embodiments of the present invention relate to an antenna device and an electronic device including the same. Specifically, various embodiments of the present invention relate to an antenna device for providing short-range wireless communication of a millimeter wave (mmWave) band and an electronic device including the same. An antenna device for providing short-range wireless communication, according to various embodiments of the present invention, comprises: a first member comprising a first surface; a second member which comprises a hole or groove formed on at least a partial area thereof and a second surface facing the first surface; and an antenna module disposed at the position of the hole or groove, wherein the first surface and the second surface are spaced a predetermined distance apart (Continued)

from each other to induce an electromagnetic wave for the short-range wireless communication.

15 Claims, 10 Drawing Sheets

(51) Int. Cl.
    *H02J 50/10*         (2016.01)
    *H01F 38/14*         (2006.01)
    *H02J 7/02*          (2016.01)
    *H01F 27/36*         (2006.01)
    *H01Q 1/38*          (2006.01)
    *H01Q 1/18*          (2006.01)

(52) U.S. Cl.
    CPC ............... *H02J 50/10* (2016.02); *H01Q 1/12* (2013.01); *H01Q 1/125* (2013.01); *H01Q 1/18* (2013.01); *H01Q 1/38* (2013.01)

(56) References Cited

U.S. PATENT DOCUMENTS

| | | | |
|---|---|---|---|
| 6,664,867 B1 | 12/2003 | Chen | |
| 7,057,558 B2* | 6/2006 | Fukushima | H01Q 9/0478 343/700 MS |
| 8,552,920 B2* | 10/2013 | Chung | H01Q 9/0464 343/834 |
| 8,963,793 B2* | 2/2015 | Saliga | H01Q 9/045 343/860 |
| 10,128,561 B2* | 11/2018 | Park | H01Q 1/241 |
| 2012/0162015 A1 | 6/2012 | Chen et al. | |
| 2012/0218160 A1 | 8/2012 | Montgomery et al. | |
| 2013/0266048 A1 | 10/2013 | Chang et al. | |
| 2015/0116178 A1 | 4/2015 | Kim et al. | |
| 2015/0147978 A1 | 5/2015 | Davis et al. | |
| 2015/0236412 A1 | 8/2015 | Bily et al. | |
| 2016/0028162 A1* | 1/2016 | Ou | H01Q 1/2283 343/905 |
| 2016/0161671 A1 | 6/2016 | Park et al. | |
| 2017/0288299 A1* | 10/2017 | Ikeda | H01Q 9/0421 |

FOREIGN PATENT DOCUMENTS

| | | |
|---|---|---|
| CN | 103700932 A | 4/2014 |
| CN | 105960735 A | 9/2016 |
| CN | 205692962 A | 11/2016 |
| CN | 106329127 A | 1/2017 |
| EP | 2493018 A1 | 8/2012 |
| KR | 10-1163574 B1 | 7/2012 |
| KR | 10-2013-0010797 A | 1/2013 |
| KR | 10-2015-0051923 A | 5/2015 |
| KR | 10-2016-0100786 A | 8/2016 |
| KR | 10-1697304 B1 | 1/2017 |

OTHER PUBLICATIONS

Chinese Office Action dated Sep. 3, 2020, issued in a counterpart Chinese Application No. 201880012643.4.
«Electronic Test» , No. 12 Design of UAV search system based on short-range wireless communication technology, pp. 4-5, Baixia Wu; Jul. 17, 2015.

* cited by examiner

ANTENNA DEVICE AND ELECTRONIC DEVICE INCLUDING SAME

TECHNICAL FIELD

Various embodiments of the present invention relate to an antenna device and an electronic device including the same. More particularly, various embodiments of the present invention relate to an antenna device and an electronic device including the same for providing short range wireless communication of an ultrahigh frequency (mmWave) band.

BACKGROUND ART

In order to satisfy increases in demand for wireless data traffic now that a 4G communication system is commercially available, efforts are being made to develop an enhanced 5G communication system or a pre-5G communication system. A 5G communication system or a pre-5G communication system is referred to as a beyond 4G network communication system or a post LTE system. In order to achieve a high data transfer rate, consideration is being given to implementing such a 5G communication system in an ultrahigh frequency (mmWave) band (e.g., 60 GHz band).

In particular, various attempts have been undertaken for applying a 5G communication system to an Internet of Thing (IoT) network. For example, technologies such as a sensor network, machine to machine (M2M) communication, and machine type communication (MTC) have been implemented by the techniques of beamforming, multi input multi output (MIMO), and array antenna, which are 5G communication technologies.

As one of the attempts for applying the 5G communication system to an IoT network, a technique has been developed that supports direct point-to-point (P2P) communication between peripheral devices without using a network of a communication provider. For example, a method has been developed of exchanging information between IoT devices or transmitting media of a large capacity such as video or music through short range wireless communication technology.

DISCLOSURE OF INVENTION

Technical Problem

Electronic devices for providing a short range wireless communication system are becoming gradually smaller and lighter. Such electronic devices may include an integrated small antenna (e.g., microstrip antenna) according to constraints in space and demand for low power consumption.

An ultrahigh frequency (mmWave) band used in the 5G communication system has a problem of strong linearity and low diffraction for a radio wave. Therefore, antennas used in the 5G communication system have a property that a gain is sharply reduced as a horizontal distance between the antennas increases.

That is, in order to support P2P communication between devices using the short range wireless communication system, there is a restriction that alignment of the antenna included in each device should correspond. For example, when alignment between antennas does not correspond, P2P communication between devices may be unavailable.

An antenna device and an electronic device including the same according to various embodiments of the present invention have been made in view of the above problems and provide an improved short range wireless communication system while maintaining versatility of the antenna without use of a special communication technique and/or a separate power management technique. The present invention provides an electronic device that can reduce a shape error between a housing and a window curved surface.

Solution to Problem

In accordance with an aspect of the present invention, an antenna device for providing short range wireless communication includes a first member including a first surface; a second member including a hole or a groove in at least a partial area and including a second surface facing the first surface; and an antenna module disposed at a position of the hole or the groove, wherein the first surface and the second surface have a predetermined separation distance to induce an electromagnetic wave of the short range wireless communication.

In accordance with another aspect of the present invention, an electronic device for providing short range wireless communication includes an antenna device including a first member including a first surface, a second member including a hole or a groove in at least a partial area and a second surface facing the first surface, and an antenna module disposed at a position of the hole or the groove, wherein the first surface and the second surface have a predetermined separation distance to induce an electromagnetic wave of short range wireless communication.

Advantageous Effects of Invention

According to various embodiments of the present invention, an antenna device and an electronic device including the same can be provided for reducing a multipath and increasing received power by inducing an electromagnetic wave.

According to various embodiments of the present invention, an antenna device and an electronic device including the same can be provided for radiating electromagnetic waves with uniform omnidirectional intensity and performing communication of an ultrahigh frequency (mmWave) band without corresponding alignment.

MODE FOR THE INVENTION

Hereinafter, various embodiments of this document will be described in detail with reference to the accompanying drawings. It should be understood that embodiments and terms used in the embodiments do not limit technology described in this document to a specific embodiment and include various changes, equivalents, and/or replacements of a corresponding embodiment. The same reference numbers are used throughout the drawings to refer to the same or like parts. Unless the context otherwise clearly indicates, words used in the singular include the plural, and the plural includes the singular. In this document, an expression such as "A or B" and "at least one of A or/and B" may include all possible combinations of the together listed items. An expression such as "first" and "second" used in this document may indicate corresponding constituent elements regardless of order and/or importance, and such an expression is used for distinguishing a constituent element from another constituent element and does not limit corresponding constituent elements. When it is described that a constituent element (e.g., a first constituent element) is "(functionally or communicatively) coupled to" or is "connected to" another constituent element (e.g., a second constituent element), it should be understood that the constituent element may be directly connected to the other constituent element or may be connected to the other constituent element through another constituent element (e.g., a third constituent element).

In this document, "configured to (or set to)" may be interchangeably used in hardware and software with, for example, "appropriate to", "having a capability to", "changed to", "made to", "capable of", or "designed to" according to a situation. In any situation, an expression "device configured to" may mean that the device is "capable of" being configured together with another device or component. For example, a "processor configured to (or set to) perform phrases A, B, and C" may mean an exclusive processor (e.g., an embedded processor) for performing a corresponding operation or a generic-purpose processor (e.g., CPU or application processor) that can perform a corresponding operation by executing at least one software program stored at a memory device.

An electronic device according to various embodiments of this document may include at least one of, for example, a smart phone, tablet personal computer (PC), mobile phone, video phone, electronic book reader, desktop PC, laptop PC, netbook computer, workstation, server, personal digital assistant (PDA), portable multimedia player (PMP), MP3 player, medical device, camera, and wearable device. The wearable device may include at least one of an accessory type device (e.g., watch, ring, bracelet, ankle bracelet, necklace, glasses, contact lens), head-supported-device (HMD), textile or clothing integral type device (e.g., electronic clothing), body attachment type device (e.g., skin pad or tattoo), and bio implantable circuit. In some embodiments, the electronic device may include at least one of, for example, a television, digital video disk (DVD) player, audio device, refrigerator, air-conditioner, cleaner, oven, microwave oven, washing machine, air cleaner, set-top box, home automation control panel, security control panel, media box, game console, electronic dictionary, electronic key, camcorder, and electronic frame.

In another embodiment, the electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MRI) device, computed tomography (CT) device, scanning machine, and ultrasonic wave device), navigation device, global navigation satellite system (GNSS), event data recorder (EDR), flight data recorder (FDR), vehicle infotainment device, ship electronic equipment (e.g., ship navigation device, gyro compass), avionics, security device, vehicle head unit, industrial or home robot, drone, automated teller machine (ATM) of a financial institution, point of sales (POS) of a store, and Internet of things device (e.g., bulb, various sensors, sprinkler, fire alarm, thermostat, street light, toaster, exercise device, hot water tank, heater, boiler). According to some embodiments, the electronic device may include at least one of furniture, a portion of a building/structure or a vehicle, electronic board, electronic signature receiving device, projector, and various measurement devices (e.g., water supply, electricity, gas, or electric wave measurement device). In various embodiments, the electronic device may be flexible or may be two or more combinations of the foregoing various devices. An electronic device according to an embodiment of this document is not limited to the foregoing devices. In this document, a term "user" may indicate a person using an electronic device or a device (e.g., artificial intelligence electronic device) using an electronic device.

Figure 1A:
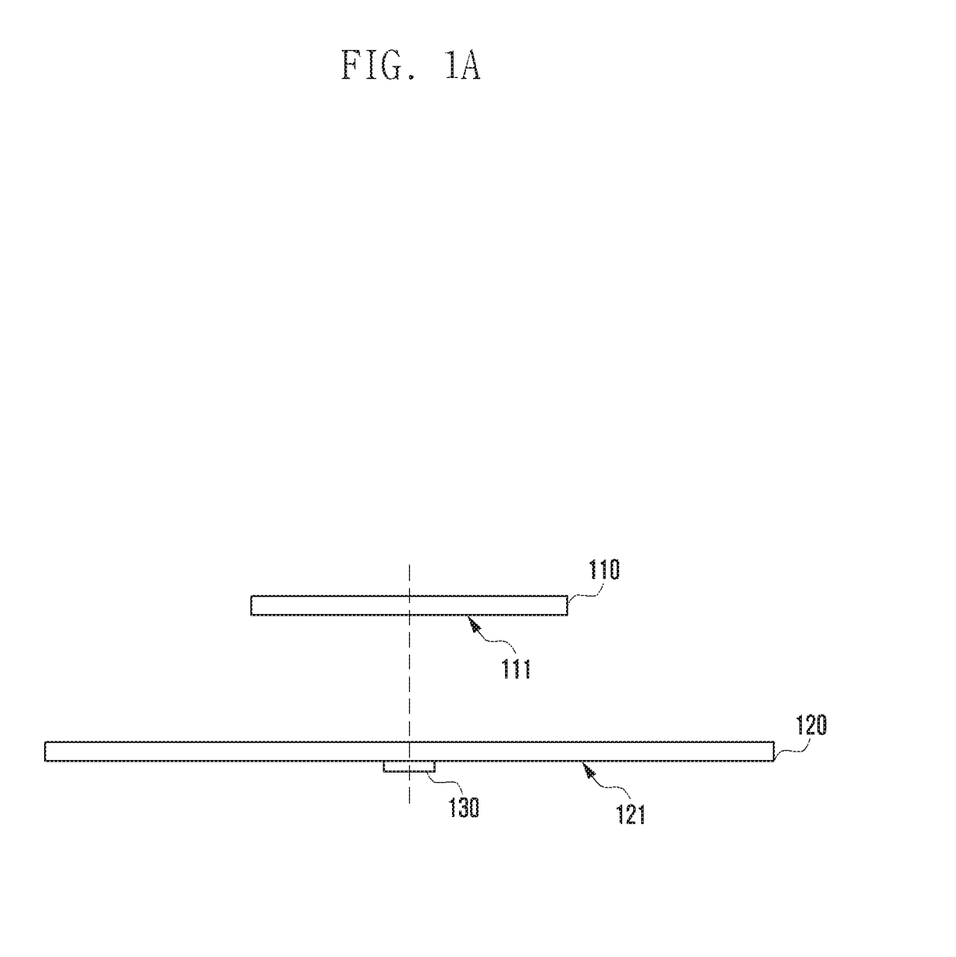
FIGS. 1A to 1C are diagrams illustrating an antenna device according to various embodiments of the present invention.
Figure 1B:
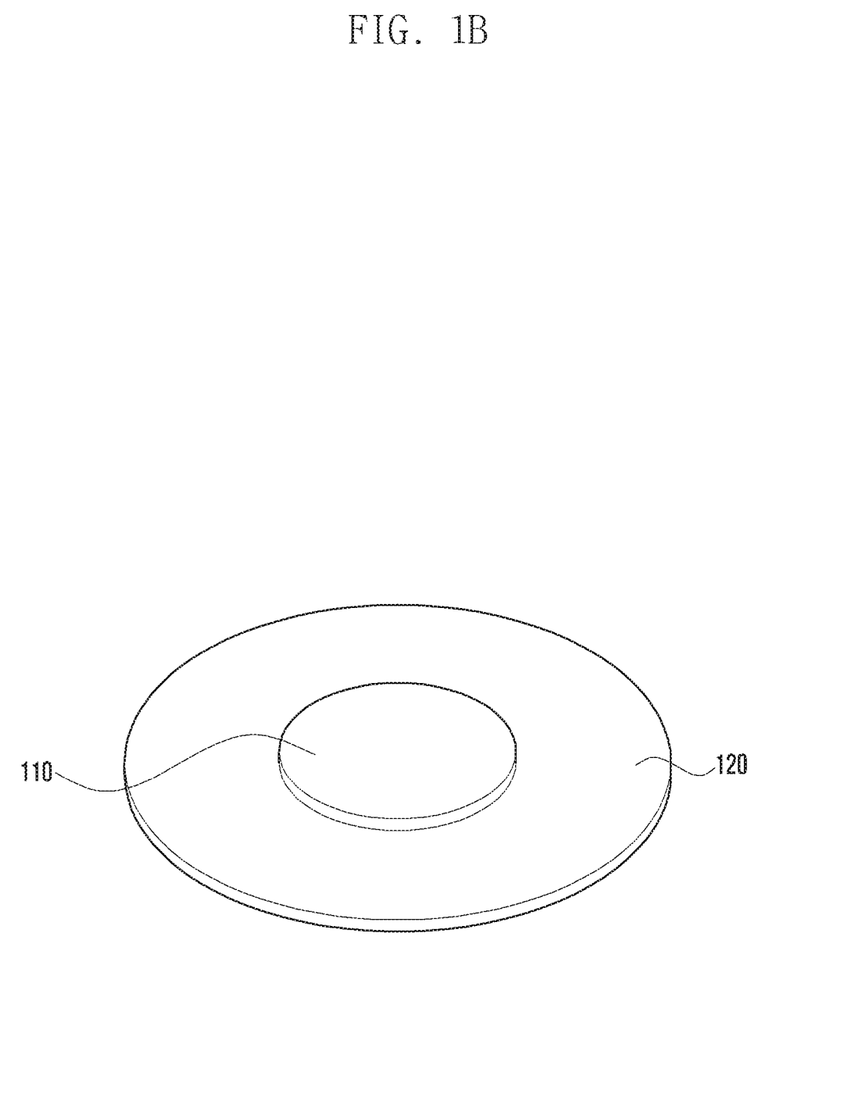
Figure 1C:
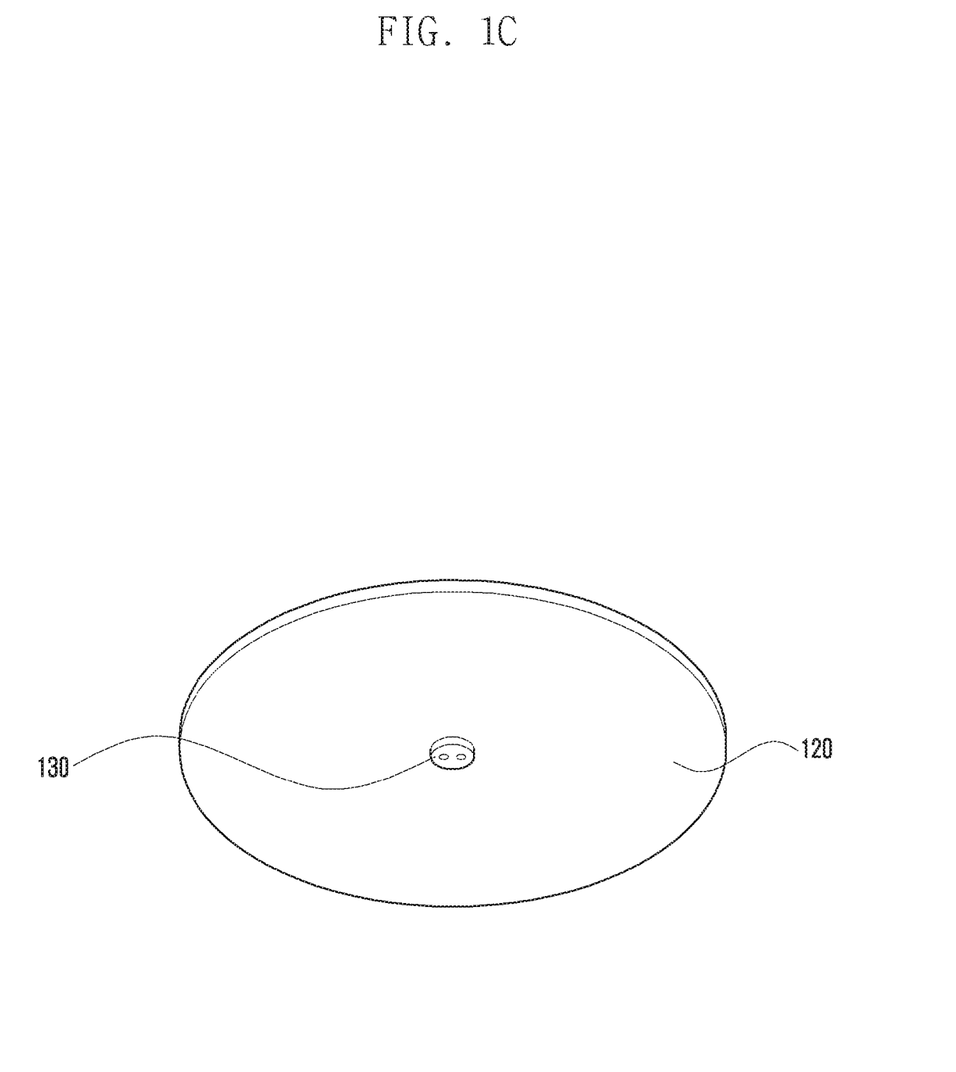

FIGS. 1A to 1C are diagrams illustrating an antenna device according to various embodiments of the present invention. FIG. 1A is a side view illustrating an antenna device, FIG. 1B is a perspective view illustrating an antenna device viewed from the upper end, and FIG. 1C is a perspective view illustrating an antenna device viewed from the lower end.

With reference to FIGS. 1A to 1C, the antenna device may include a first member 110, a second member 120, and an antenna module 130. In some embodiments, the antenna device may omit at least one of components or may additionally include other components.

According to various embodiments, the first member 110 may include a first surface 111 perpendicular to a direction of an electromagnetic wave emitted from the antenna module 130. The first surface 111 may be formed in, for example, a circular surface, an oval surface, or a polygonal surface. In order to have uniform omnidirectional signal strength and to reduce a multipath, the first surface 111 preferably is a circular surface.

The first surface 111 may include an electrical conductive material, for example, a metal material so as to reflect an electromagnetic wave emitted from the antenna module 130 or an electromagnetic wave emitted from an external electronic device. In order for the first surface 111 to include an electrical conductive material, the first member 110 may include a metal material. Further, in some embodiments, the first member 110 including a metal or non-metal material may be plated to enable the first surface 111 to include a metal material.

FIGS. 1A to 1C illustrate a case in which the first member 110 has a plate shape, but the present invention is not limited thereto, and the first member 110 may be formed in various shapes including the first surface 111. For example, the first member 110 may be formed in a semi-spherical shape or a polypyramid shape including the first surface 111.

According to various embodiments, the second member 120 may include a hole or a groove in at least some areas and include a second surface 121 facing the first surface 111. The second surface 121 may be configured with, for example, a circular surface, an oval surface, or a polygonal surface. In order to have uniform omnidirectional signal strength and to reduce a multipath, the second surface 121 is also preferably formed in a circular surface.

According to various embodiments, the hole or the groove may be a transmission path of electromagnetic waves. For example, the antenna module 130 is disposed in close contact with the lower end of the hole or may be disposed to be inserted into the groove. In this case, electromagnetic waves emitted from the antenna module 130 may be transmitted along the hole or the groove.

The second surface 121 may include an electrically conductive material, for example, a metal material so as to reflect electromagnetic waves emitted from the antenna module 130 or electromagnetic waves emitted from an external electronic device. The second member 120 may include a metal material so that the second surface 121 includes an electrically conductive material. Further, in some embodiments, the second member 120 including a metal or non-metal material may be plated to enable the second surface 121 to include a metal material.

According to various embodiments, the second surface 121 may be configured to have an area at least greater than that of the first surface 111. This is because some spaces that are not covered by the first surface are used as a transmission path of electromagnetic waves. For example, electromagnetic waves emitted from an external electronic device may reach the second surface through such spaces.

According to various embodiments, the first surface 111 and the second surface 121 may have a predetermined separation distance to induce electromagnetic waves. The antenna device may include an inner space because of a separation distance between the first surface 111 and the second surface 121. Therefore, the inner space may be a wave guide for electromagnetic waves. For example, electromagnetic waves reaching the second surface may be guided to propagate to the antenna module 130 along a wave guide.

FIGS. 1A to 1C illustrate a plate-shaped second member 120, but the present invention is not limited thereto and the second member 120 may be formed in various shapes including a second surface 121. For example, the second member 120 may be formed in a semi-spherical shape or a polypyramid shape including the second surface 121.

According to various embodiments, various kinds of antenna modules 130 that support short range wireless communication of an ultrahigh frequency (mmWave) band may be universally used as the antenna module 130. For example, the antenna module 130 may include various antennas having an omnidirectional emission pattern. In order to emit electromagnetic waves through a hole, the antenna module 130 may be disposed in close contact with the lower end of the second member 120 or may be inserted into a groove. For example, the antenna module 130 may have close contact with a surface facing in a direction opposite to that of a second surface of the second member to emit an electromagnetic wave in a direction perpendicular to the first member 110. Although not illustrated in FIGS. 1A to 1C, the antenna module 130 may further include a power supply part for receiving power and a ground portion to be used when transmitting and receiving electromagnetic waves.

Figure 2:
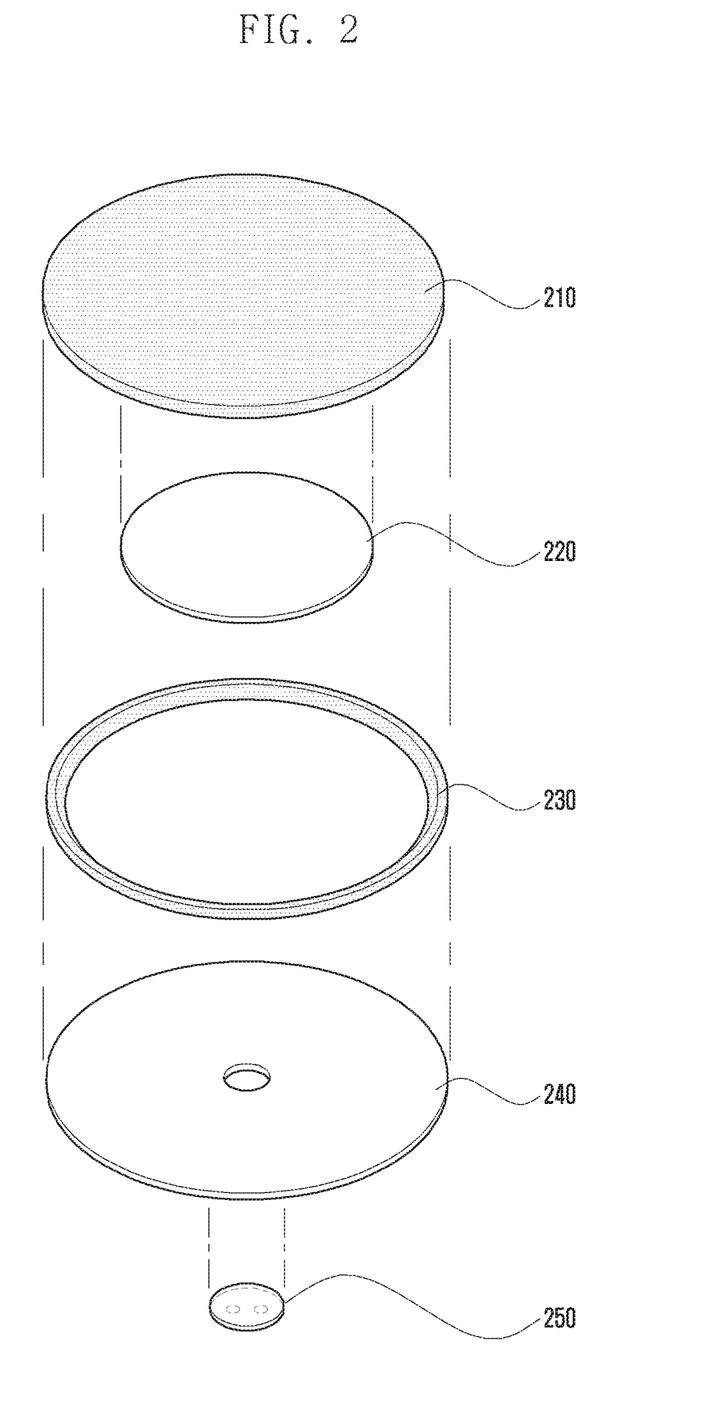
FIG. 2 is a diagram illustrating an antenna device according to various embodiments of the present invention.

FIG. 2 is a diagram illustrating an antenna device according to various embodiments of the present invention.

With reference to FIG. 2, the antenna device may include a first dielectric material 210, first member 220, second dielectric material 230, second member 240, and antenna module 250. In some embodiments, the electronic device may omit at least one of constituent elements or may additionally include another constituent element.

The first dielectric material 210 may perform a function of electrically inducing electromagnetic waves so that electromagnetic waves emitted from the antenna module 250 have a uniform omnidirectional emission pattern and are emitted to the outside. For this purpose, the first dielectric material 210 may include a material that prevents flow of a direct current and performs a function of an electrical insulator. For example, the dielectric material may include various dielectric materials such as poly sterol, ferrite, or epoxy resin having a large dielectric constant.

Figure 3:
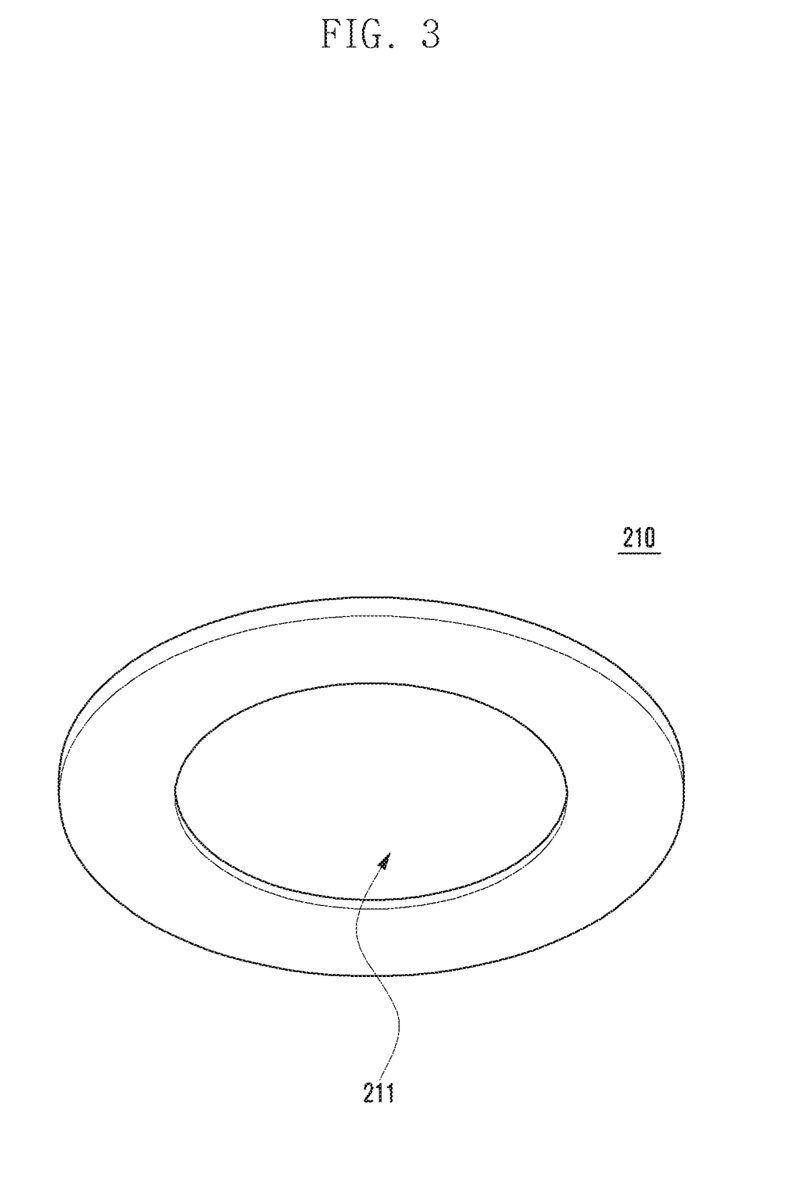
FIG. 3 is a perspective view illustrating a first dielectric material viewed from the lower end according to various embodiments of the present invention.

FIG. 3 is a perspective view illustrating a first dielectric material 210 viewed from the lower end according to various embodiments of the present invention. With reference to FIG. 3, the first dielectric material 210 may include an insertion groove 211 to insert the first member 220. FIG. 3 illustrates a circular insertion groove 211 so as to enclose the disk-shaped first member 220, but the present invention is not limited thereto. For example, a shape of the insertion groove 211 on the first dielectric material 210 may be different according to a shape of the first member 220. However, in order to have a uniform omnidirectional emission pattern, a shape of the insertion groove 211 is preferably a circular shape, as in the first member 220.

According to various embodiments, the first member 220 may include a first surface perpendicular to a direction of electromagnetic waves emitted from the antenna module 250. The first member 220 is substantially the same as the first member 220 of FIG. 1 and therefore a detailed description thereof will be omitted.

According to various embodiments, the second dielectric material 230 may perform a function of directing an advancing direction of electromagnetic waves emitted from the antenna module 250 in a direction of the first dielectric material 210 or directing electromagnetic waves emitted from the external device in a direction of the antenna module 250.

Figure 4A:
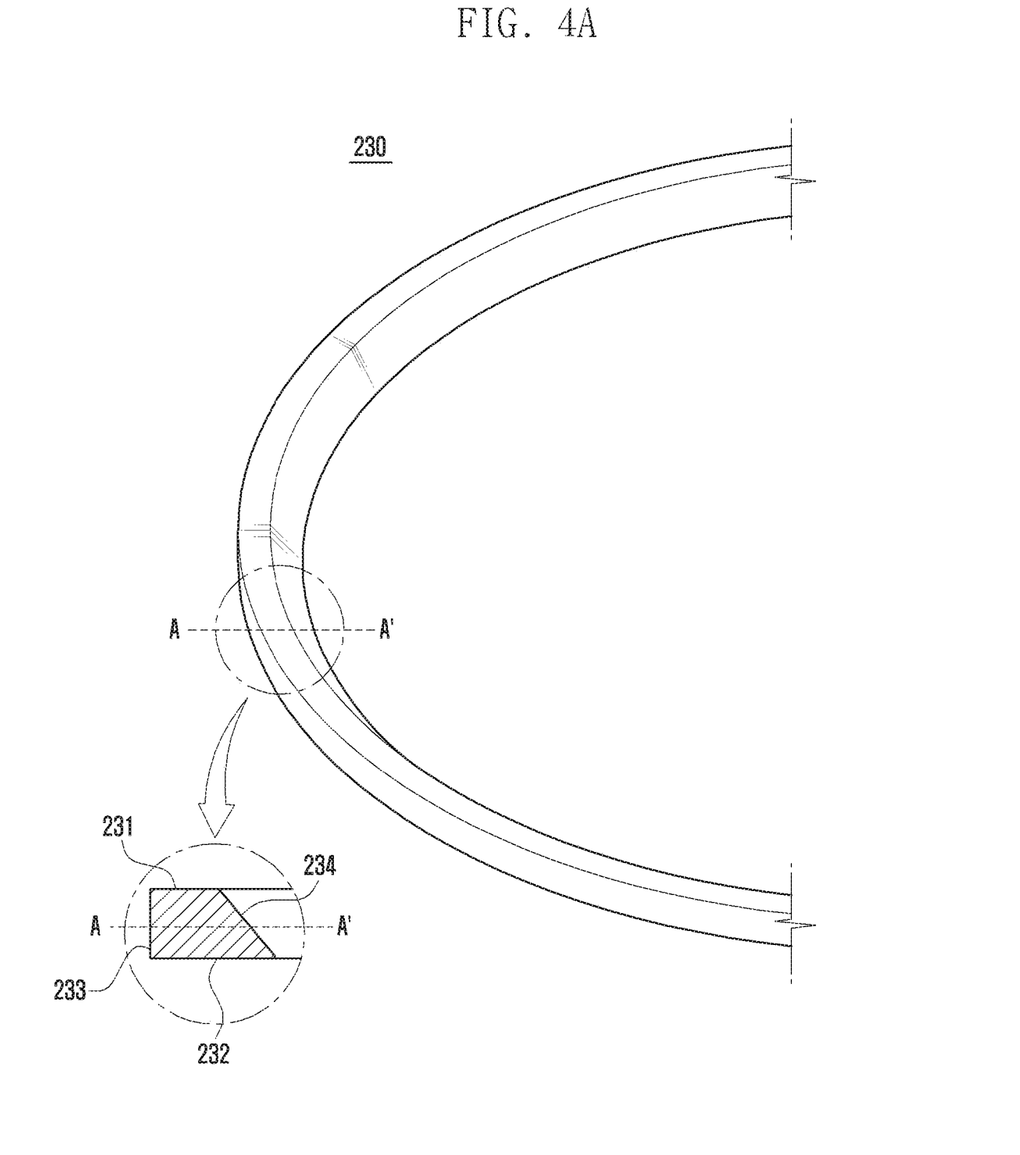
FIG. 4A is a perspective view illustrating a part of a second dielectric material viewed from the upper end according to various embodiments of the present invention.

FIG. 4A is a perspective view illustrating a part of the second dielectric material 230 viewed from the upper end according to various embodiments of the present invention.

With reference to FIG. 4, the second dielectric material 230 may be formed in a ring shape. For example, the second dielectric material 230 may be formed in a circular ring shape, an oval ring shape, or a polygonal ring shape. In order to have a uniform omnidirectional emission pattern, the second dielectric material 230 preferably has a circular ring shape.

According to various embodiments, the second dielectric material 230 may include an inclined surface that extends in a direction of an edge thereof and inclined to a horizontal direction of the second member 240. For example, in a cross-sectional view of the second dielectric material 230 taken along line AA', a cross section of the second dielectric material 230 may be formed in a polygonal shape including at least one side that extends in an edge direction and inclined to a horizontal direction of the second member 240. For example, a cross section of the second dielectric material 230 may have a trapezoidal shape including an upper side 231, a lower side 232, a side 233 perpendicular to the lower side, and a side 234 inclined to the lower side.

FIG. 4A illustrates a cross-section of the second dielectric material 230 having a trapezoidal shape, but the present invention is not limited thereto and the second dielectric material 230 may be formed in various polygonal shapes (e.g., triangular shape).

Figure 4B:
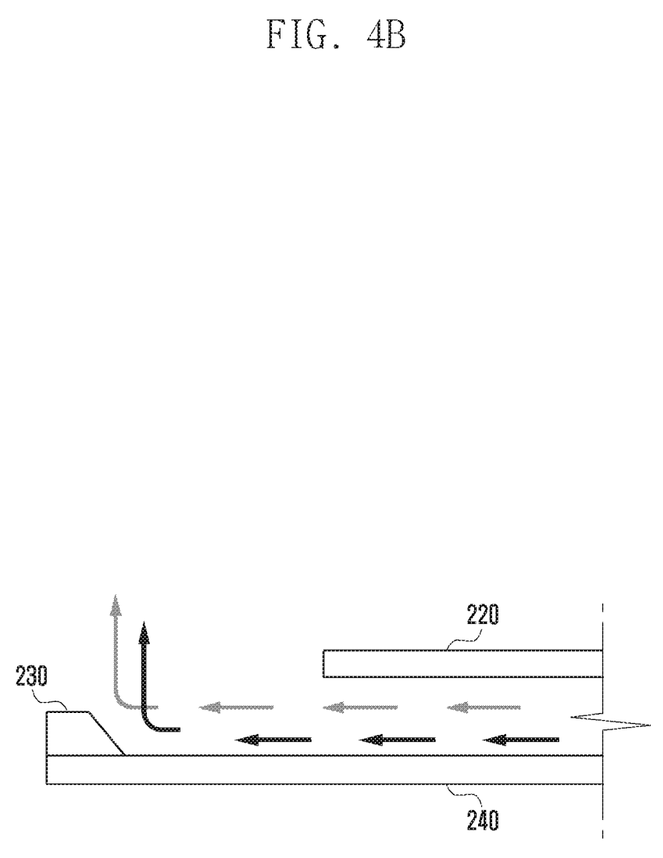
FIG. 4B is a diagram illustrating the effect of a second dielectric material including an inclined surface according to various embodiments of the present invention.

FIG. 4B is a diagram illustrating the effect of the second dielectric material 230 including an inclined surface according to various embodiments of the present invention.

According to various embodiments, the second dielectric material 230 including an inclined surface may reduce a multipath of electromagnetic waves. For example, when the second dielectric material 230 including an inclined surface is disposed between the first member 220 and the second member 240, electromagnetic waves advancing to the second dielectric material 230 are reflected from the inclined surface to be induced in a desired direction. By inducing electromagnetic waves in a desired direction, electromagnetic waves reflected from a housing and/or an outer wall of the electronic device that receives the antenna device may be reduced and thus a multipath may be reduced.

According to various embodiments, the second member 240 may include a hole or a groove in at least a partial area thereof and include a second surface facing the first surface.

According to various embodiments, various kinds of antenna modules 250 that support short range wireless communication of an ultrahigh frequency (mmWave) band may be universally used as the antenna module 250.

The second member 240 and the antenna module 250 are substantially the same as the second member 240 and the antenna module 250 of FIG. 1 and therefore a detailed description thereof will be omitted.

Figure 5:
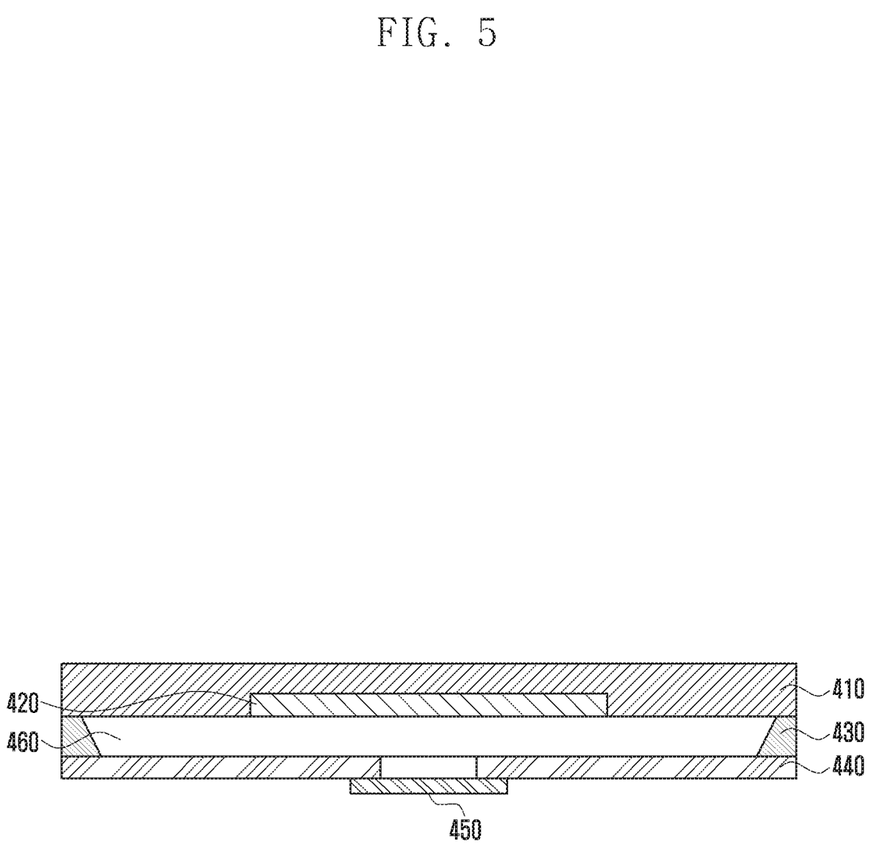
FIG. 5 is a cross-sectional view illustrating an antenna device according to various embodiments of the present invention.

FIG. 5 is a cross-sectional view illustrating an antenna device according to various embodiments of the present invention.

According to various embodiments, a first member 420 may be inserted into an insertion groove formed at the lower end of a first dielectric material 410. FIG. 5 illustrates that the first member 420 is inserted into the first dielectric material 410 to form a predetermined interface, but the first member 420 may be fully inserted into the first dielectric material 410 to form a concave interface or the first member 420 may be only partially inserted into the first dielectric material 410 to form a convex interface.

According to various embodiments, a second dielectric material 430 may be disposed between the first member 420 and a second member 440 and perform a support means function so that the first member 420 and the second member 440 have a predetermined separation distance. For example, the second dielectric material 430 may have a predetermined height in a direction of the first member 420 or a direction perpendicular to the first member 420. The predetermined height may be different according to a required separation distance between the first member 420 and the second member 440. For example, a separation distance between the first member 420 and the second member 440 may be about ¼ of a length of a wavelength of electromagnetic waves that provide short range wireless communication. For example, in an antenna device that supports short range wireless communication of 60 GHz band, a separation distance between the first member 420 and the second member 440 may be about 1.25 mm. Therefore, when a height of the second dielectric material 430 is about 1.25 mm, a separation distance between the first member 420 and the second member 440 may be about 1.25 mm. An inner space may be formed because of a separation distance between the first member 420 and the second member 440, and the internal space may be a wave guide. For example, each of interfaces between the first member 420 and the second member 440 may repeatedly reflect electromagnetic waves to resultantly propagate electromagnetic waves in a predetermined direction.

According to various embodiments, an antenna module 450 may be disposed in close contact with the lower end of the second member 440. Electromagnetic waves emitted from the antenna module 450 may be induced to propagate through a hole or a groove formed in the second member. Electromagnetic waves propagated through the hole or the groove may be uniformly emitted to the outside along a wave guide formed in the internal space. Similarly, electromagnetic waves emitted from an external electronic device may be propagated to the antenna module 450 along the wave guide.

Figure 6:
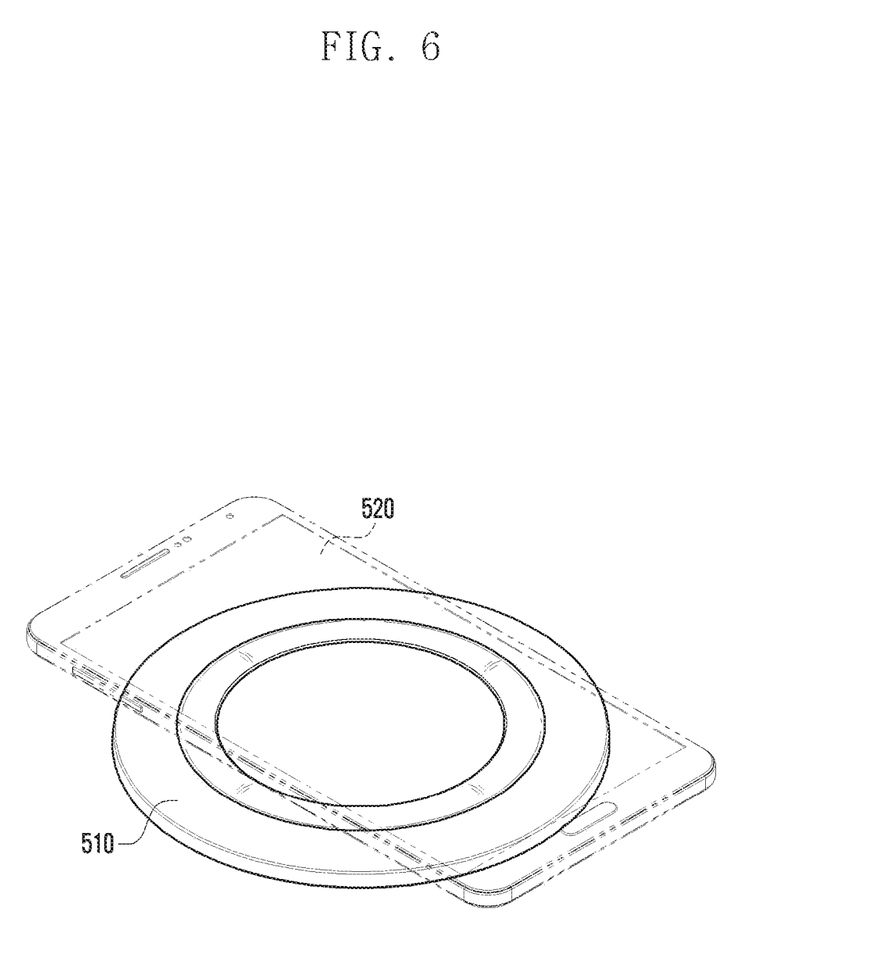
FIG. 6 is a diagram illustrating an electronic device according to various embodiments of the present invention.

FIG. 6 is a diagram illustrating an electronic device according to various embodiments of the present invention.

With reference to FIG. 6, an electronic device 510 may include a wireless power transmission device. The electronic device 510 may transmit wireless power such that when an external electronic device 520 approaches, the external electronic device 520 may be charged. FIG. 6 illustrates that the external electronic device 520 approaches on a circular support, but the support of the electronic device 510 may have various shapes, for example, an oval shape or a polygonal shape.

The electronic device 510 for transmitting wireless power to the external electronic device 520 may include at least a charging coil, a ferrite sheet, and a printed circuit board (PCB). Further, in order to perform short range wireless communication with the external electronic device 520, the electronic device 510 may further include an antenna device according to the present invention.

Figure 7:
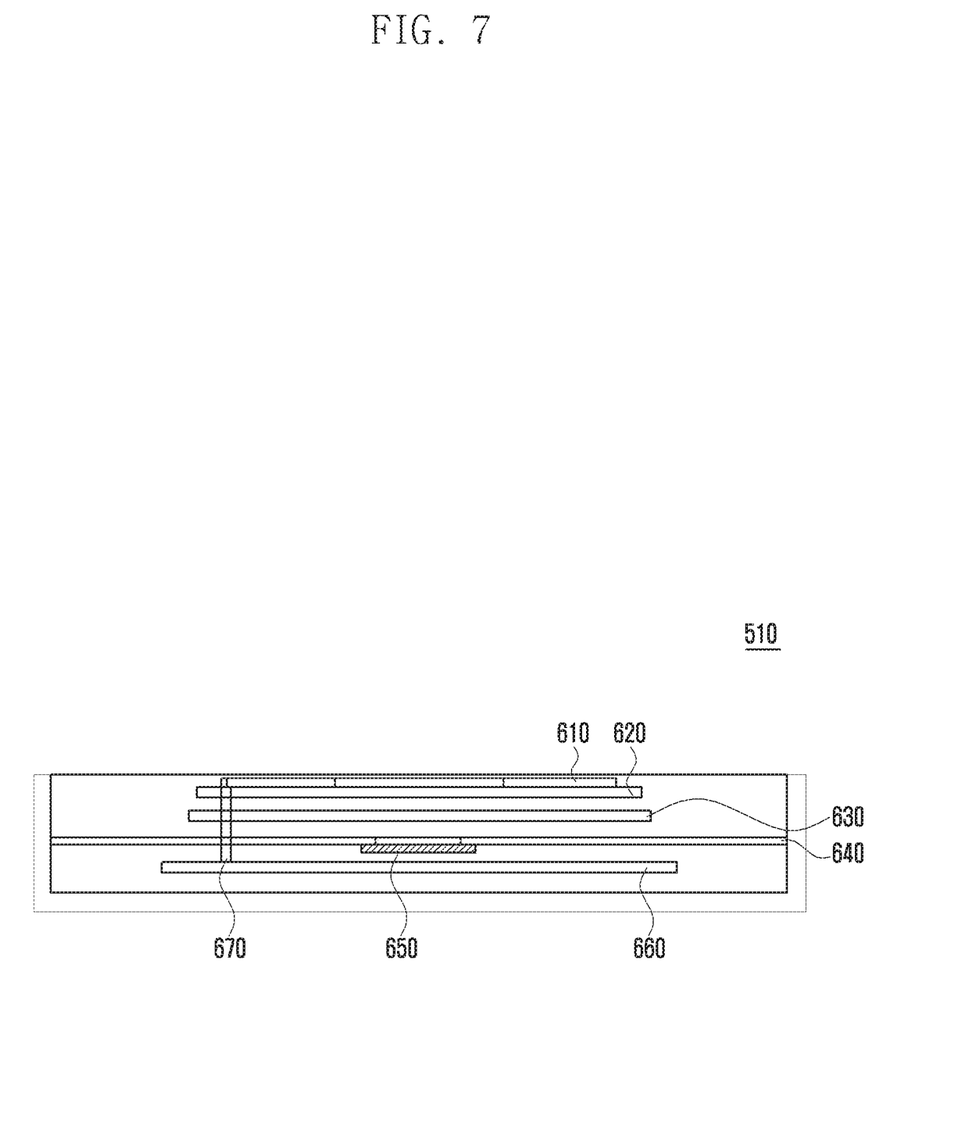
FIG. 7 is a cross-sectional view illustrating an internal structure of an electronic device according to various embodiments of the present invention.

FIG. 7 is a cross-sectional view illustrating an internal structure of an electronic device according to various embodiments of the present invention.

With reference to FIG. 7, the electronic device may include a charging coil 610, ferrite sheet 620, first member 630, second member 640, antenna module 650, PCB, and power supply part. In some embodiments, the antenna device may omit at least one of the components or may additionally include another component.

According to various embodiments, the charging coil 610 may be disposed at the top portion of the electronic device. The charging coil 610 may generate, for example, a strong magnetic field so as to transfer wireless power to the external electronic device 520. In this case, the magnetic field may be generated in a direction of the external electronic device 520 and a direction opposite to the external electronic device 520.

According to various embodiments, the ferrite sheet 620 may be disposed at the lower end of the charging coil 610. The ferrite sheet 620 may shield a magnetic field generated in an opposite direction of the external electronic device 520. The ferrite sheet 620 may shield a magnetic field to prevent electromagnetic interference (EMI) from occurring and inductance from changing.

According to various embodiments, the first member 630 may be disposed at the lower end of the ferrite sheet 620. The first member 630 may include a first surface having the same area as or an area greater than that of the ferrite sheet 620. For example, when the ferrite sheet 620 has a diameter of 54 mm, the first member may include a first surface having a diameter of 54 mm or may include a first surface having a diameter greater than that of 54 mm.

According to various embodiments, the second member 640 may be disposed at the lower end of the first member 630. The second member 640 may include a hole or a groove in at least a partial area and include a second surface facing the first surface. An area of the second surface may be configured to have an area at least greater than that of the first surface. In order to prevent a loss of electromagnetic waves, the second surface is preferably configured to contact a housing or an outer wall of the electronic device. For example, when a diameter of a cylindrical electronic device is 86 mm, a second surface may be formed in a circular surface having a diameter of 86 mm.

According to various embodiments, the antenna module 650 may be disposed in close contact with the lower end of the second member 640. Electromagnetic waves emitted from the antenna module 650 may be induced to propagate through a hole or a groove formed in the second member.

According to various embodiments, the PCB may be disposed at the lower end of the antenna module 650. The PCB may transfer power and a control signal to the charging coil 610 through a power supply part. Further, although not illustrated, the PCB may transfer power and a control signal to the antenna module 650. FIG. 7 illustrates that a single PCB transfers power and a control signal to the charging coil 610 and the antenna module 650, but two or more PCBs may transfer power and a control signal to the charging coil 610 and the antenna module 650. In such a case, the PCBs may be disposed at the upper end of the first member 630.

The embodiments of the present invention disclosed in this specification and drawings only present a specific example in order to easily describe the technical contents according to an embodiment of the present invention and to help an understanding of the embodiments of the present invention, and they do not intend to limit the scope of the present invention. It will be apparent to those skilled in the art that other modifications based on the technical idea of the present invention are possible in addition to the embodiments disclosed herein.

The invention claimed is:

1. An antenna device for providing short range wireless communication, the antenna device comprising:
   a first member comprising a first surface;
   a second member comprising a hole or a groove in at least a partial area and comprising a second surface facing the first surface; and
   an antenna module disposed at a position of the hole or the groove,
   wherein the first surface and the second surface have a predetermined separation distance to induce an electromagnetic wave of the short range wireless communication.

2. The antenna device of claim 1, wherein the second surface is configured to have an area at least greater than that of the first surface.

3. The antenna device of claim 1, wherein the predetermined separation distance is ¼ of a length of a wavelength of the electromagnetic wave.

4. The antenna device of claim 1, further comprising a ring-shaped second dielectric material disposed between the first member and the second member.

5. The antenna device of claim 4, wherein the second dielectric material comprises an inclined surface extending in an edge direction thereof and inclined in a horizontal direction of the second member.

6. The antenna device of claim 5, wherein a cross section of the second dielectric material has a polygonal shape comprising the inclined surface.

7. The antenna device of claim 4, further comprising a first dielectric material enclosing the first member and configured to enable the electromagnetic wave to have a uniform omnidirectional emission pattern.

8. The antenna device of claim 1, wherein the first surface or the second surface is formed in a shape of at least one of a circular surface, an oval surface, and a polygonal surface.

9. The antenna device of claim 1, wherein the first surface or the second surface is formed in a shape of at least one of a circular surface, an oval surface, and a polygonal surface.

10. The antenna device of claim 1, wherein the electromagnetic wave has a wavelength of an ultrahigh frequency (mmWave) band.

11. An electronic device for providing short range wireless communication, the electronic device comprising:
    an antenna device comprising a first member comprising a first surface, a second member comprising a hole or a groove in at least a partial area and comprising a second surface facing the first surface, and an antenna module disposed at a position of the hole or the groove,
    wherein the first surface and the second surface have a predetermined separation distance to induce an electromagnetic wave of short range wireless communication.

12. The electronic device of claim 11, further comprising:
    a charging coil configured to generate a magnetic field so as to transfer wireless power to an external electronic device (520); and
    a ferrite sheet configured to shield a magnetic field generated in the charging coil.

13. The electronic device of claim 12, wherein the first member is positioned in a lower end of the ferrite sheet, and the first surface has the same area as or an area at least greater than that of the ferrite sheet.

14. The electronic device of claim 13, wherein the second surface is configured to have an area at least greater than that of the first surface.

15. The electronic device of claim 11, wherein the predetermined distance is ¼ of a length of a wavelength of the electromagnetic wave.

* * * * *